No. 892,739. PATENTED JULY 7, 1908.
G. KNOCK.
FILTER.
APPLICATION FILED MAY 17, 1907.
2 SHEETS—SHEET 1.
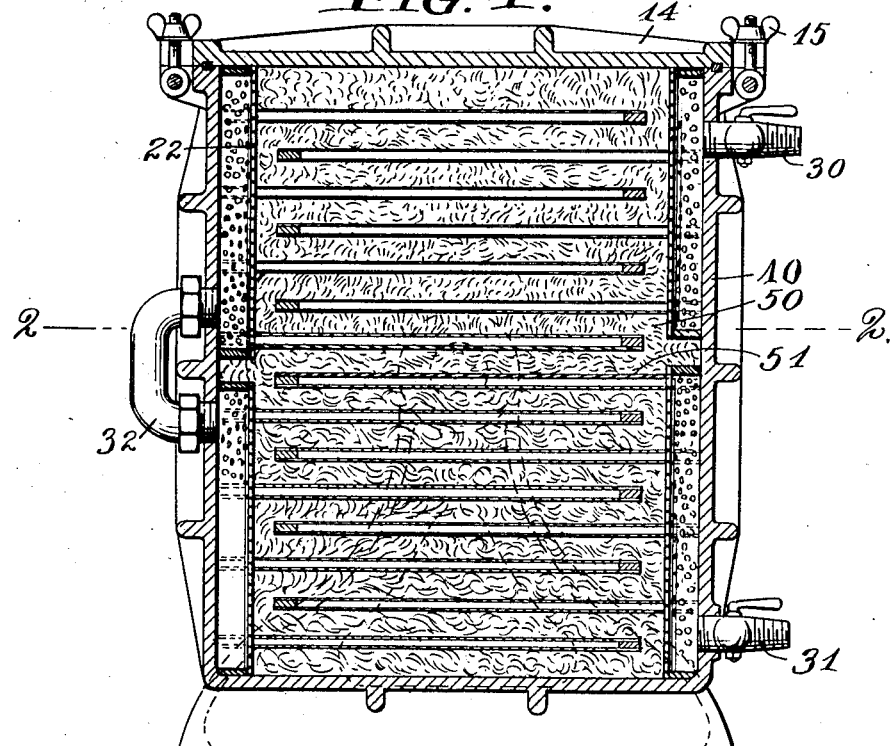
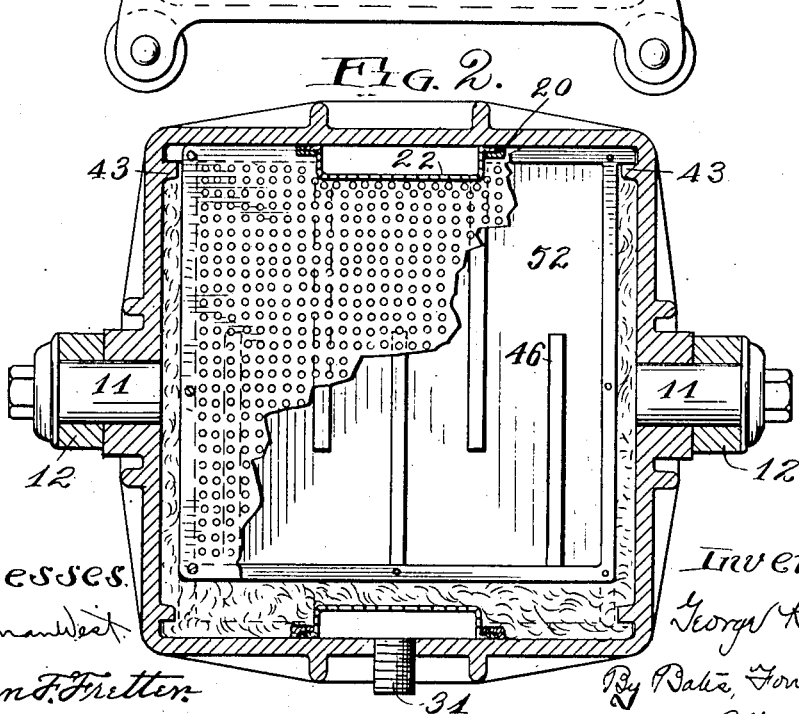
Witnesses
Brennan West
Nathan F. Fretter.
Inventor
George Knock,
By Baker, Foris & Hill,
Attorneys

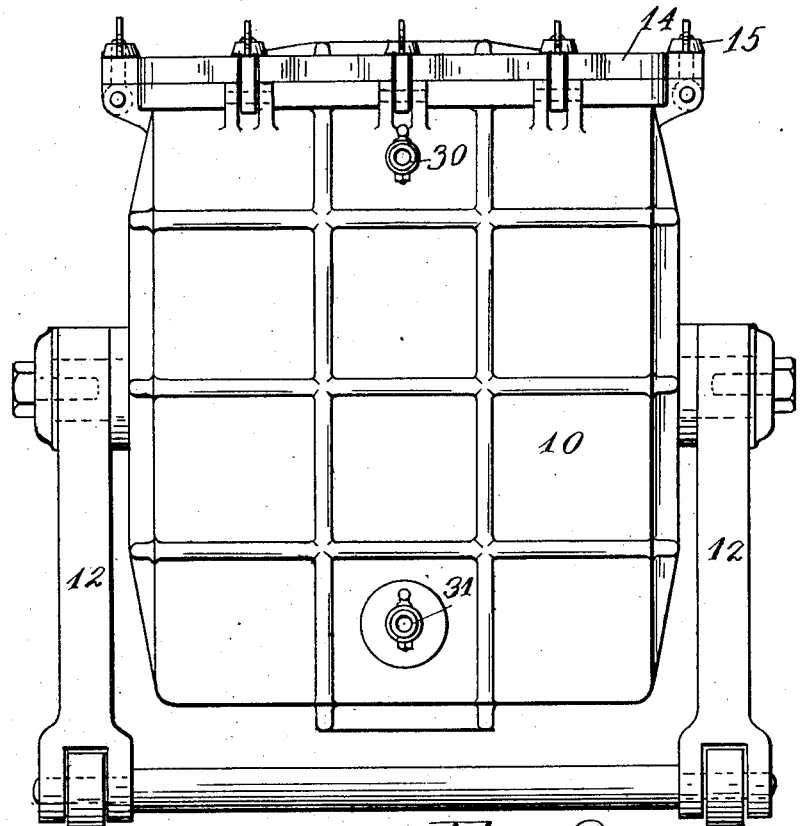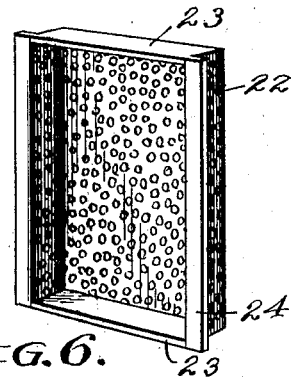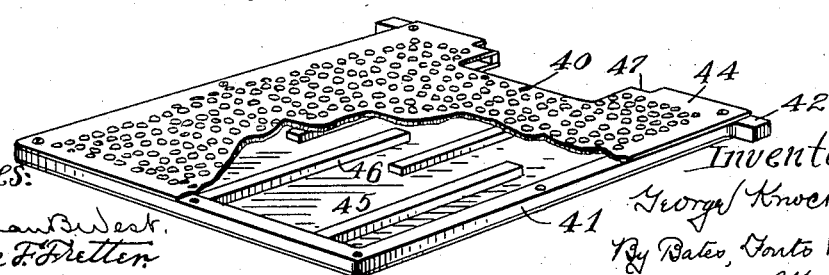

UNITED STATES PATENT OFFICE.

GEORGE KNOCK, OF CLEVELAND, OHIO.

FILTER.

No. 892,739.  Specification of Letters Patent.  Patented July 7, 1908.

Application filed May 17, 1907. Serial No. 374,290.

*To all whom it may concern:*

Be it known that I, GEORGE KNOCK, a citizen of the United States, residing at Cleveland, in the county of Cuyahoga and State of Ohio, have invented a certain new and useful Improvement in Filters, of which the following is a full, clear, and exact description, reference being had to the accompanying drawings.
The object of this invention is to provide a very efficient and easily cleaned filter. The filter operates with pulp-like filtering material—the pulp being forced into place by a suitable press—and is well adapted for use in filtering beer. My filter is so arranged that it may be employed either for single filtering, or by a very simple adjustment converted into a tandem filter. The means by which I accomplish these various objects are hereinafter more fully explained and their essential features are summarized in the claims.

In the drawings, Figure 1 is a vertical central section through my filter. Fig. 2 is a horizontal section thereof substantially on the line 2—2 of Fig. 1. Fig. 3 is a side elevation of the filter at right angles to Fig. 1. Fig. 4 is a cross section through one of the perforated trays which provide the entrance and exit orifices. Fig. 5 is a perspective view of one of the filter trays with the top portion partly broken away. Fig. 6 is a perspective view of one of the entrance or exit conduits with which the trays communicate.

As shown in the drawings, 10 represents a suitable rectangular tank or box having trunnions 11 extending from its opposite sides which have bearings in the upright standards 12 of a suitable wheeled truck.
14 represents a cover for the tank which is adapted to be held thereto by thumb screws 15 screwing onto bolts secured to the tank. Suitable packing between the cover and tank insures a tight connection.
In the interior of the tank 10, on opposite sides thereof, are located the overhanging strips or ribs 20 extending vertically of the filter at a suitable distance apart. Between these ribs are located the intake and exit conduits designated 22. These conduits are preferably metal troughs or boxes open on one side and having a perforated plate on the opposite side and perforated edges. The ends 23 of the boxes are preferably imperforate. Extending along the edges of the box are outward flanges 24 which are adapted to occupy the grooves provided between the ribs 20 and the wall of the filter. This arrangement prevents any lateral displacement of the trays in the tank except in a vertical direction, that is to say, the trays cannot slide from side to side of the tank, nor can they twist so as to alter their relation to the conduit with which they are in communication. Suitable intake and exit openings are provided through the wall of the filter which communicate with the interior of these boxes 22 when in place. Thus as shown in Fig. 1, the pipes 30 and 31 are adapted to convey the liquid to and from the filter, while on the other side, the U-shaped pipe 32 is adapted to make the connection from one of the boxes 22 to the other box on that side. The purpose of this special arrangement of piping will be hereinafter explained.

Within the filter, the liquid is conveyed from the entrance conduit and to the exit conduit by the trays 40, of which there are a number located one above the other and communicating alternately with the conduits 22 on opposite side of the filter. Each tray 40 consists of a frame 41 forming the boundary of the tray and having projecting ears 42 which are adapted to lie behind ribs 43 formed on the interior of the tank. Secured to the upper and lower surfaces of the frames 41 are metal plates 44 and 45, of which at least one is perforated and usually both, as hereinafter explained. Secured to one of the plates 44 and 45 are ribs 46, projecting alternately from opposite ends of the frame, as shown in Figs. 2 and 5. A recess 47 is formed in one end of the tray which is adapted to fit over and make a reasonably close connection with the intake or exit box 22. The frame member 41 is omitted at such recess wherefore the intake or exit box communicates directly with the interior of the tray through the perforations in the box and the open end of the tray.

The liquid passes from the intake conduit into the trays and out through the perforations thereof and through the filter mass 50 and into the perforations of the exit trays and thus into the exit conduits and out of the filter. The ribs 46 cause the liquid to take a sinuous travel inside the trays, thus insuring its distribution to substantially the whole mass of filtering material. These ribs also strengthen the trays and prevent their being bent when the filter is packed.

It will be seen that not only the trays but the intake and exit conduits are very easily removed from the filter to allow its cleaning. In packing the filter, the intake and exit conduits are put in place, and the trays and filter material are alternately placed and the filter material is compacted by a suitable press acting through the open upper end of the tank. In such compression the trays adjust themselves with the compacted filter mass. After the material is packed, the cover is secured by the thumb screws and the filter is ready for operation.

Fig. 1 shows my filter arranged for tandem operation so that the same liquid receives two filterings. This I accomplish by making the trays 40 nearest the center of the filter with their adjacent sides imperforate, as shown at 51, in Figs. 1 and 2. The intake and exit conduits are also made each in two sections, as shown. Now with such a construction, if the liquid be brought to the pipe 30, it is filtered through the upper half of the filter, and then passes through the pipe 32 to the lower half, allowing its exit through the pipe 31. The imperforate sides of the centermost trays, together with the pulp packed around them, prevent any substantial leakage of liquid from the upper half of the filter directly to the lower half. In other words, the liquid will take the path of least resistance and will pass out through the upper exit trays and through the U-shape pipe 32 to the lower intake trays.

When it is desired to operate the filter for single filtering, one long intake conduit and one long exit conduit are provided in place of the two short pairs shown in the drawing, and trays with both sides perforated are used at all points in the filter. The U-shape pipe 32 is disconnected and one of the openings which it is shown as connecting is capped, the other opening being used as an intake. One of the pipes 30 or 31 is closed by its cock, and the other is used as an exit pipe. Thus my filter can be very easily converted from a tandem to a single filter, as desired. In place of these conversions, the filter, as shown in Fig. 1, may be used as two independent filters, the pipe 32 being removed and both of the inlet pipes shown as connected therewith used as intakes and both of the pipes 30 and 31 used as exits or vice versa.

When it is desired to remove the packing for cleaning, the cover is simply removed and the filter inverted on its trunnions, and the whole interior mass, including the trays and conduits, is taken out, allowing very effective cleaning.

Having thus described my invention, I claim:

1. In a filter, in combination, a tank, a plurality of removable perforated conduits secured on the inner faces of opposite walls of the tank, and removable perforated filtering trays having open ends communicating with said conduit.

2. In a filter, the combination of a tank, a pair of perforated trough like members removably secured on the inner faces of opposite walls of the tank, and perforated trays projecting alternately from such opposite walls and having their interior in communication with said trough like members.

3. In a filter, the combination of a tank, perforated conduits secured on the inner faces of opposite walls, perforated trays, each having a recess to receive a conduit and having its edge open at such recess to establish communication with the interior of a conduit.

4. In a filter, the combination of a tank, a perforated conduit on the inner side thereof, and a perforated tray having a recess to receive said conduit and having its edge open at such recess to establish communication with the interior of the conduit, said tray and the tank having coöperating engaging shoulders to hold the tray in position.

5. In a filter, the combination of a rigid tank, a liquid conduit carried thereby, and a perforated tray adapted to communicate with the interior of the conduit, said tray having projecting lugs at its corners and said tank having upright grooves into which the lugs of successive trays extend.

6. In a filter, the combination of a tank and a removable tray slidably engaging the walls of the tank, and means for preventing lateral displacement of the tray comprising a lug upon the tray engaging a groove in the tank wall.

7. In a filter, the combination of a tank and a removable tray slidably engaging the wall of the tank, and means for preventing lateral displacement of the tray comprising a recess formed in the tray and engaging a projection upon the tank wall.

8. In a filter, the combination of a tank, removable intake and exit conduits on the inner opposite walls thereof, and removable perforated trays communicating with said conduits and slidably engaging the tank, whereby said trays, together with filtering material, may alter their position as the material is compacted.

9. In a filter, the combination of a tank, a conduit removably held on the inner side of the filter and comprising a trough like member with ends and a perforated side, a passageway from the outside of the filter to its interior at such conduit, and a series of perforated trays adapted to be held within the tank and formed to have their open edges communicating with the conduit.

10. The combination in a filter, of a tank, intake and exit conduits made in sections, perforated trays communicating with the conduits, the trays adjacent to the space between the sections having imperforate sides, and means for establishing communication from one section to the adjacent section, whereby the filter may operate tandem.

11. In a filter, the combination of a tank, removable perforated conduits on the inner side thereof, removable perforated trays communicating with the conduits, intake and exit passageways, and means comprising a tray having a perforated top and a solid bottom piece for stopping the flow through the filtering mass at a certain point, and causing it to take a course outside of the same, whereby the filter may operate in tandem or singly, as desired.

12. In a filter, a perforated tray comprising a flat frame forming the boundary of the tray, flat sheet metal members secured to the top and bottom of the frame, a portion of the frame being omitted at one edge to provide an entrance into the tray.

13. In a filter, a perforated tray comprising a flat frame forming a boundary of the tray, flat sheet metal members secured to the top and bottom of the frame, a portion of the frame being omitted at one edge to provide an entrance into the tray, and partitions within the tray extending from opposite edges part way across to give the liquid a sinuous course to prevent the tray from collapsing under external pressure.

14. In a filter, a perforated tray comprising a flat frame forming the boundary of the tray, flat sheet metal members secured to the top and bottom of the frame and at least one of them perforated, a portion of the frame being omitted at one edge to provide an entrance into the tray and the frame extending outwardly at the corners of such edge to make securing lugs.

In testimony whereof, I hereunto affix my signature in the presence of two witnesses.

GEORGE KNOCK.

Witnesses:
ALBERT H. BATES,
WILLIAM PLOTZ.